US007042864B1

(12) United States Patent
Leung et al.

(10) Patent No.: US 7,042,864 B1
(45) Date of Patent: May 9, 2006

(54) ENABLING PUSH TECHNOLOGIES FOR MOBILE IP

(75) Inventors: Kent K. Leung, Mountain View, CA (US); Gopal K. Dommety, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1074 days.

(21) Appl. No.: 09/630,055

(22) Filed: Aug. 1, 2000

(51) Int. Cl.
    H04L 12/66 (2006.01)
(52) U.S. Cl. ...................................... 370/338; 370/354
(58) Field of Classification Search ................ 370/331, 370/338, 431–439, 401, 238, 254, 410, 420, 370/426, 328–329, 351–356, 392–393, 349
    See application file for complete search history.

(56) References Cited

U.S. PATENT DOCUMENTS

| 4,692,918 | A | | 9/1987 | Elliott et al. ................... 370/85 |
|---|---|---|---|---|
| 5,016,244 | A | | 5/1991 | Massey et al. ................. 370/16 |
| 5,018,133 | A | | 5/1991 | Tsukakoshi et al. ... 340/825.05 |
| 5,218,600 | A | | 6/1993 | Schenkyr et al. ............. 370/16 |
| 5,371,852 | A | | 12/1994 | Attanasio et al. ........... 395/200 |
| 5,473,599 | A | | 12/1995 | Li et al. ......................... 370/16 |
| 6,445,922 | B1 | * | 9/2002 | Hiller et al. ................. 455/433 |
| 6,466,571 | B1 | * | 10/2002 | Dynarski et al. ........... 370/352 |
| 6,473,413 | B1 | * | 10/2002 | Chiou et al. ................. 370/331 |
| 6,501,746 | B1 | * | 12/2002 | Leung ......................... 370/338 |
| 6,510,153 | B1 | * | 1/2003 | Inoue et al. ................. 370/354 |
| 6,542,992 | B1 | * | 4/2003 | Peirce et al. ................ 713/153 |
| 6,578,085 | B1 | * | 6/2003 | Khalil et al. ................ 709/241 |
| 6,587,882 | B1 | * | 7/2003 | Inoue et al. ................. 709/245 |
| 6,591,306 | B1 | * | 7/2003 | Redlich ....................... 709/245 |
| 6,665,537 | B1 | * | 12/2003 | Lioy ........................ 455/435.1 |
| 6,665,718 | B1 | * | 12/2003 | Chuah et al. ............... 709/227 |
| 6,742,036 | B1 | * | 5/2004 | Das et al. ................... 709/226 |

OTHER PUBLICATIONS

Release notes for 3Com Corporation, "*Conducting a Redundant Route for Network Resiliency*," Mar. 1994, *NET Builder Family Bridge/Router* pp. 26-29.
Uyless Black, "*TCP/IP and related Protocols*," 1992, McGraw-Hill, Inc., pp. 226-249.

(Continued)

*Primary Examiner*—Zarni Maung
*Assistant Examiner*—Van Nguyen
(74) *Attorney, Agent, or Firm*—Beyer Weaver & Thomas LLP

(57) ABSTRACT

Methods and apparatus for enabling a Mobile Node supporting mobile IP to roam without an assigned IP address and receive lookups indicating that a Corresponding Node wants to send information to the Mobile Node are disclosed. A name lookup may be sent from a Corresponding Node to a Home Agent that has previously registered the Mobile Node. The name lookup may be sent through an intermediate device, including a Domain Name Server, such that the intermediate device contacts the Home Agent. During the name lookup process, an IP address is allocated to the Mobile Node and a data path is established between the Home Agent and the Mobile Node via a Foreign Agent. When the lookup is completed successfully, the Home Agent sends the IP address allocated to the Mobile Node in the name lookup process to the device requesting the lookup. The IP address of the Mobile Node may then be used by the Corresponding Node to "push" information to the Mobile Node.

39 Claims, 11 Drawing Sheets

OTHER PUBLICATIONS

T. Li, et al., RFC 2281 "*Cisco Hot Standby Router Protocol (HSRP),*" Mar. 1998.

Chambless, et al., "*Home Agent Redundancy Protocol (HARP),*" Oct. 27, 1997.

C. Perkins, "*IP Mobility Support,*" RFC2002, IBM Corporation, Oct. 1996.

"*Mobile IP,*" Release 12.0(1)T, pp. 1-55.

Montenegro, G., "*Reverse Tunneling for Mobile IP,*" RFC 2344, Sun Microsystems, Inc., pp. 1-19, May 1998.

D. Harkins and D. Carrel, "*The Internet Key Exchange (IKE),*" Cisco Systems, pp. 1-33, Jun. 1998.

D. Cong and M. Hamlen, and C. Perkins, "*The Definitions of Managed Objects for IP Mobility Support using SMIv2,*" RFC2006, Motorola and IBM, pp. 1-52, Oct. 1996.

Aboba and Beadles, "*The Network Access Identifier*" RFC 2486, Jan. 1999.

Calhoun and Perkins, "*Mobile IP Network Access Identifier Extension for IPv4*", Network Working Group, RFC 2794, Mar. 2000, pp. 1-8.

Postel, J., "*Simple Mail Transfer Protocol*", STD 10, RFC821, Aug. 1982.

Crocker, D. and P. Overrell, "*Augmented BNF For Syntax Specifications: ABNF*", RFC 2234, Nov. 1997.

\* cited by examiner

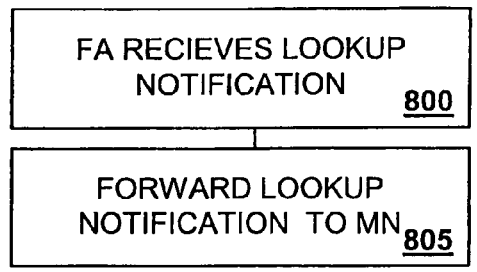
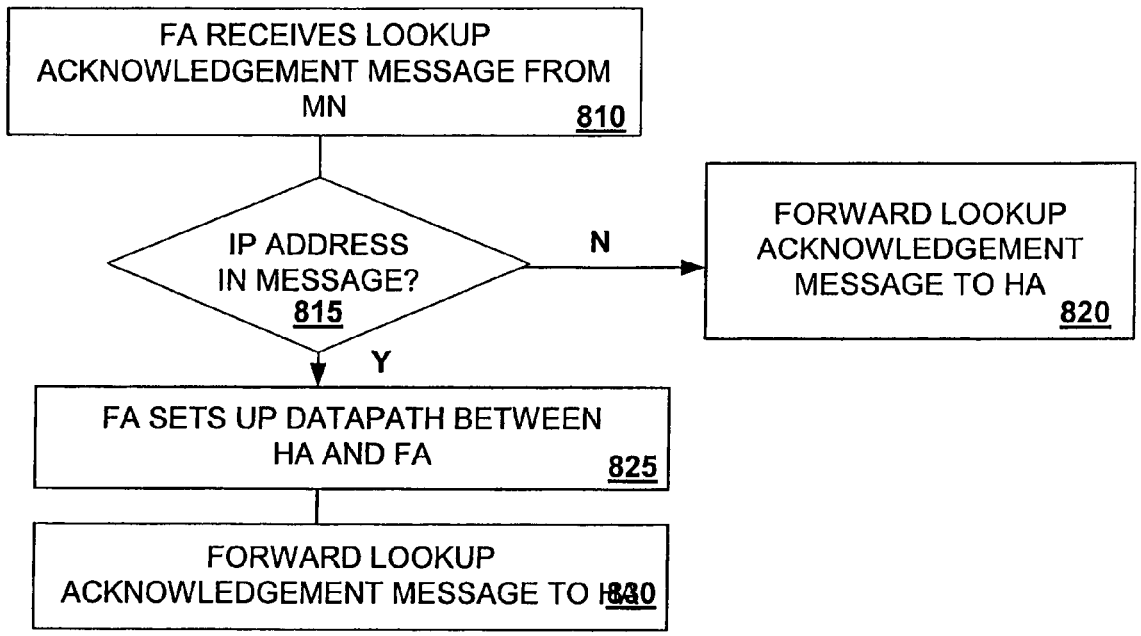

ENABLING PUSH TECHNOLOGIES FOR MOBILE IP

BACKGROUND OF THE INVENTION

1. Field of the Invention

The present invention relates to network technology. More particularly, the present invention relates to enabling push technologies in a mobile IP environment.

2. Description of the Related Art

Mobile IP is a protocol which allows laptop computers or other mobile computer units (referred to herein as "Mobile Nodes") to roam between various sub-networks at various locations—while maintaining Internet and/or WAN connectivity. Without Mobile IP or related protocol, a Mobile Node would be unable to stay connected while roaming through various sub-networks. This is because the IP address required for any node to communicate over the Internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the Internet. This is not an acceptable state-of-affairs in the age of portable computational devices.

To address this problem, the Mobile IP protocol has been developed and implemented. An implementation of Mobile IP is described in RFC 2002 of the IP Routing for Wireless/Mobile Hosts (Mobile IP) Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown, a Mobile IP environment 2 includes the Internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) connected to its home network segment (in a wired or wireless network) connects with the Internet through its designated Home Agent. When the Mobile Node roams, it communicates via the Internet through an available Foreign Agent. Presumably, there are many Foreign Agents available at geographically disparate locations to allow wide spread Internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the Internet 4 through Home Agent 8 (an appropriately configured router denoted R2). Note that Home Agent 8 need not directly connect to the Internet. For example, as shown in FIG. 1, it may be connected through another router (a router R1 in this case). Router R1 may, in turn, connect one or more other routers (e.g., a router R3) with the Internet.

Now, suppose that Mobile Node 6 is removed from its home base network segment 12 and roams to a remote network segment 14. Network segment 14 may include various other nodes such as a PC 16. The nodes on network segment 14 communicate with the Internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request from the Mobile Node 6 to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. A message from the Mobile Node is then packetized and forwarded through Foreign Agent 10 over the Internet 4 and to corresponding node 18 (as indicated by the dotted line "packet from MN") according to a standard Internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the Internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on network segment 14. The packet forwarding mechanism implemented by the Home and Foreign Agents is often referred to as "tunneling."

In a mobile IP environment, a consumer may utilize some data services that automatically gather and send information to the mobile node based on an information profile of the consumer. For example, a consumer might request stock quotes for certain stocks to be sent regularly to one or more of their mobile nodes. Typically, the mobile node receives the requested information from the corresponding node but does not send information back to the corresponding node. Since the information transfer is initiated by the data service and "pushed" to the consumer, the methods for performing the information transfer initiated by the data service typically are referred to as push technologies.

For a mobile node to receive information from a data service employing push technologies, the corresponding node sending the information requires a current IP address for the mobile node. Moreover, each consumer may potentially employ multiple devices capable of receiving "pushed" information. For example, a single consumer might carry a portable phone, a portable computer, a personal digital assistant and other devices, each capable of receiving pushed information when assigned an IP address in a mobile IP environment. Thus, a large number of nodes may simultaneously receive information via push technologies in a mobile IP environment. As a result, a shortage of IP addresses that are available for allocation to mobile nodes may develop.

In view of the above, it would be desirable to have techniques for reducing the number of assigned IP addresses associated with mobile nodes during the implementation of push technologies in a mobile IP environment.

SUMMARY OF THE INVENTION

The present invention provides methods and apparatus for enabling a node supporting mobile IP to roam without an assigned IP address and receive lookups indicating that a Corresponding Node wants to send information to the Mobile Node. A name lookup from a Corresponding Node may be sent to a Home Agent that has previously registered a location of the Mobile Node. The name lookup from the Corresponding Node to the Home Agent may be sent through an intermediate device, including a Domain Name Server, such that the intermediate device contacts the Home Agent. During the name lookup process, an IP address is allocated to the Mobile Node and a data path is established between the Home Agent and the Mobile Node via a Foreign Agent. When the lookup is completed successfully, the Home Agent sends the IP address allocated to the Mobile Node in the name lookup process to the device requesting the lookup. The IP address of the Mobile Node may then be used by the Corresponding Node to "push" information to the Mobile Node.

One aspect of the present invention provides a method of registering a Mobile Node without assigning an IP address in a Home Agent that supports Mobile IP. The method may be generally characterized as including the following steps: 1) determining whether the Mobile Node requires an IP address using a first indicator in a registration request packet 2) when it is determined that the Mobile Node does not require an IP address, sending a registration reply packet containing a second indicator to the Foreign Agent for registration of the Mobile Node where the second indicator indicates that an IP address is not assigned to the Mobile Node and 3) when it is determined that the Mobile Node requires an IP address, assigning an IP address to the Mobile Node and sending the registration reply packet containing the IP address to the Mobile Node where second indicator indicates the IP address is assigned to the Mobile Node. In steps 1), 2) and 3), the first indicator and the second indicator may have an identical format. Additionally, the method may include one or more of the following additional steps 1) receiving the registration request packet containing the first indicator from the Mobile Node 2) generating the second indicator and appending the second indicator to the registration reply packet.

Another aspect of the present invention provides a method of looking up a Mobile Node when the Mobile Node has previously registered with a Home Agent that supports Mobile IP. The method may generally be characterized as including the following the steps: 1) receiving a name lookup packet for a name lookup from a lookup requester where the name lookup packet includes a lookup name, 2) composing a lookup notification packet and sending the lookup notification packet to the Mobile Node via a Foreign Agent where the lookup notification packet indicates a name lookup corresponding to the Mobile Node has been received by the Home Agent, 3) receiving a lookup acknowledgement packet from the Mobile Node via the Foreign Agent where the lookup acknowledgement packet corresponds to the lookup notification packet and 4) sending a lookup reply packet to the lookup requester indicating a status of the name lookup. For instance, the lookup reply packet may include an IP address assigned to the Mobile Node when the lookup is successful. Alternatively, the lookup reply packet may include an error indicator when the lookup is not successful (e.g., when Mobile Node has already roamed to a new Foreign Agent).

In specific embodiments, the lookup name may correspond to one or more Mobile Nodes where the lookup name refers to one or more physical devices capable of receiving the lookup notification packet or the lookup name refers to a user of one or more physical devices capable of receiving the lookup notification packet. The lookup requester may be a domain name server where the lookup name is compatible with a protocol used by a domain name server. Additionally, the method may be characterized as including one or more of the following steps: 1) prior to composing the lookup notification packet, looking up the lookup name in a lookup name table where the lookup name table maps the lookup name to one or more Mobile Node identifiers, 2) when the lookup name is not found in the lookup name table, composing the lookup reply packet and 3) sending the lookup reply packet to the lookup requester where the lookup reply packet contains an error indicator indicating that the lookup name is unavailable.

In another embodiment, the method may be characterized as including one or more of the following steps, 1) authenticating the name lookup packet from the lookup requester where the name lookup packet includes a lookup requester name 2) prior to composing the lookup notification packet, looking up the lookup requester name in a lookup requester table and 3) when the lookup requester name is not found in the lookup requester table, composing the lookup reply packet and sending the lookup reply packet to the lookup requester where the lookup reply packet contains an error indicator indicating the lookup name is unavailable.

In another embodiment, the method may be characterized as including one or more of the following steps: 1) prior to sending the lookup notification packet, marking the lookup notification packet pending in a name lookup table entry in a name lookup table where the name lookup table entry is used to track the pending lookup notification packets, 2) checking a time remaining on a lookup lifetime in the name lookup table entry corresponding to the pending lookup notification packet, 3) when the time remaining is below a certain value, composing the lookup reply packet, sending the lookup reply packet to the lookup requester where the lookup reply packet contains an error indicator indicating the lookup name is unavailable and updating the name lookup table entry from the name lookup table, 4) after receiving the lookup acknowledgement packet, updating the name lookup table entry from the name lookup table corresponding to the pending lookup notification packet. The name lookup table entry corresponding to the pending lookup notification packet may contain one or more of the following items: a) the lookup requester name, b) the lookup name, c) a lookup lifetime, d) a Mobile Node identifier identifying the Mobile Node, and e) an IP address assigned to the Mobile Node.

In another embodiment, the method may generally be characterized as including one or more of the following steps: 1) prior to sending the lookup notification packet, assigning an IP address and a registration lifetime to the Mobile Node, 2) providing the IP address and the registration lifetime assigned to the Mobile Node in the lookup notification packet and 3) after receiving the lookup acknowledgement packet from the Mobile Node via the Foreign Agent, establishing a data path between the Home Agent and the Foreign Agent wherein the data path is used by the Home Agent to send data packets to the Mobile Node from a Corresponding Node.

In another embodiment, rather than assigning an IP address to the Mobile Node prior to sending the lookup notification packet, the lookup notification packet may contain a registration request indicator requesting that the Mobile Node send a registration request packet to the Home Agent. Thus, the lookup acknowledgement packet may be a registration request packet. In addition, the lookup acknowledgement packet may contain a registration lifetime selected by the Mobile Node.

Another aspect of the present invention provides a method in a Foreign Agent of looking up a Mobile Node where the Mobile Node has previously registered with the Home Agent. The method may generally be characterized as including the following steps 1) receiving a lookup notification packet from the Home Agent where the lookup notification packet indicates a name lookup corresponding to the Mobile Node has been received by the Home Agent and 2) forwarding the lookup notification packet to the Mobile Node. Additionally, the method may also include the following steps a) receiving a lookup acknowledgement packet from the Mobile Node in response to the lookup notification packet and b) forwarding the lookup acknowledgement packet to the Home Agent c) after receiving the lookup acknowledgement, establishing a data path between the Home Agent and the Foreign Agent wherein the data path is used by the Home Agent to send data packets to the Mobile Node from a Corresponding Node via the Foreign Agent.

Another aspect of the present invention provides a method in a Foreign Agent that supports Mobile IP of registering a Mobile Node. The method may be characterized as including one or more of the following steps 1) determining whether the Mobile Node has been assigned an IP address using a first indicator in the registration reply packet, 2) when it is determined that the Mobile Node has not been assigned an IP address, updating a visitor table to indicate that the Mobile Node is visiting the Foreign Agent and forwarding the registration reply packet to the Mobile Node and 3) when it is determined that the Mobile Node has been assigned an IP address, establishing a data path between the Home Agent and the Foreign Agent, wherein the data path is used by the Home Agent to send data packets to the Mobile Node from a Corresponding Node, and forwarding the registration reply packet containing the IP address allocated to the Mobile Node.

BRIEF DESCRIPTION OF THE DRAWINGS

FIGS. 8A, 8B are flow diagrams illustrating the process steps performed by a Foreign Agent in response to a name lookup.

DETAILED DESCRIPTION OF THE INVENTION

Figure 2:
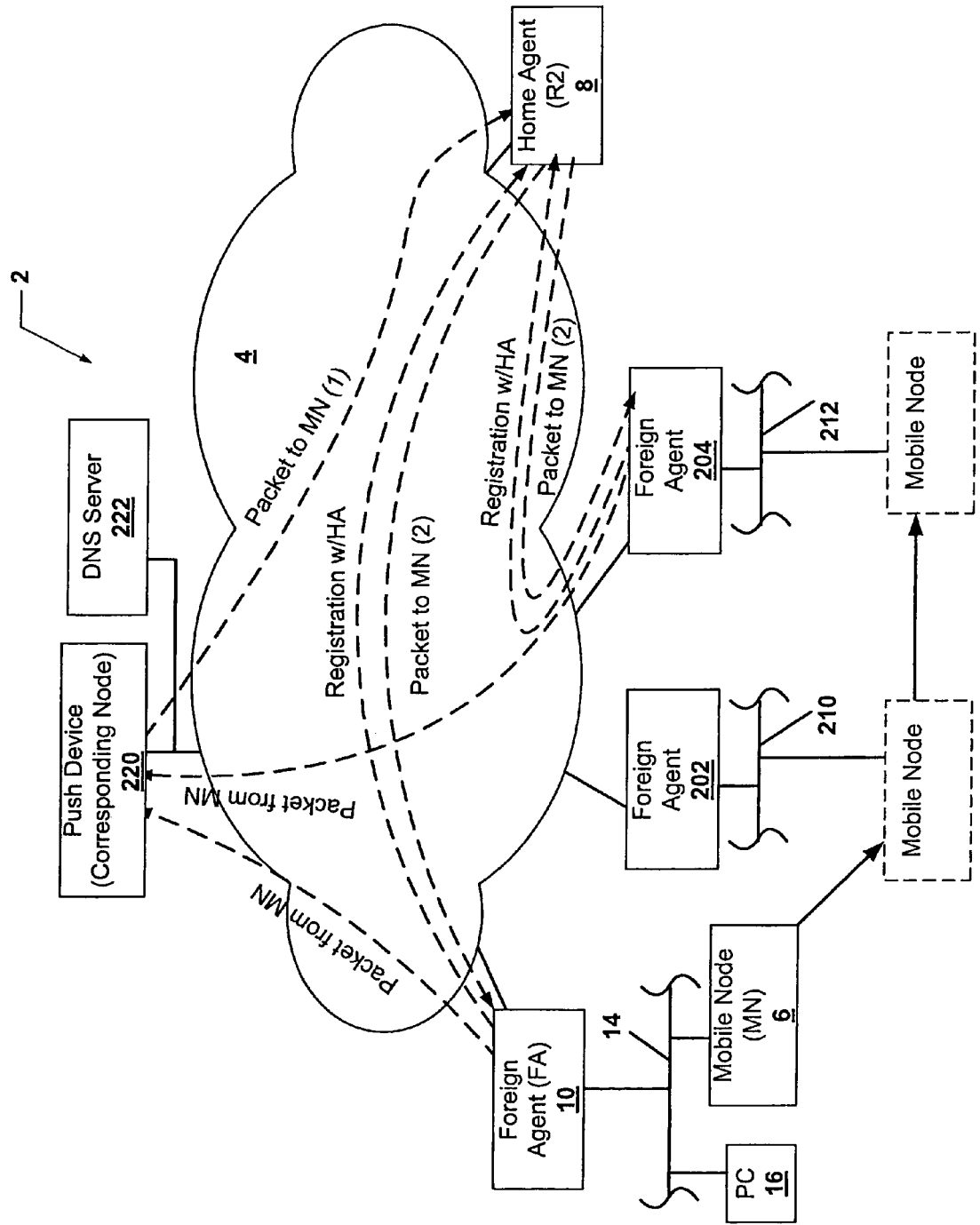
FIG. 2 is a diagram of a Mobile IP network segment and an associated environment that allows a node to roam and register with a new foreign agent without obtaining an address.

FIG. 2 is a diagram of a Mobile IP network segment and an associated environment that allows a node to roam and register with a new foreign agent without obtaining an IP address during the registration process. On a foreign network segment 14, the Mobile Node 6 may register with a Home Agent 8 via the Foreign Agent 10. For example, the registration process may be initiated when the Mobile Node 6 receives an advertisement from the Foreign Agent 10 or when a previous registration with the Home Agent has expired. The registration process may be repeated when the Mobile Node 6 roams to the foreign network segment 210 and receives an advertisement from the Foreign Agent 202. Similarly, the registration process may be repeated when the Mobile Node 6 roams to the foreign network segment 212 and receives an advertisement from the Foreign Agent 204. However, in the registration request to the Home Agent 8 via any of the Foreign Agents, including 10, 202 or 204, the Mobile Node 6 may request that an IP address not be assigned to the Mobile Node 6. For example, when the Mobile Node 6 is in some dormant state that does not require an IP address, the Mobile Node 6 may not request an IP address from the Home Agent 8. In these circumstances, the registration request merely serves to inform the Home Agent 8 of the location (i.e., foreign agent) of the Mobile Node 6. The advantage of this approach is that the number of IP addresses utilized by the Home Agent 8 at any one time may be reduced.

Figure 1:
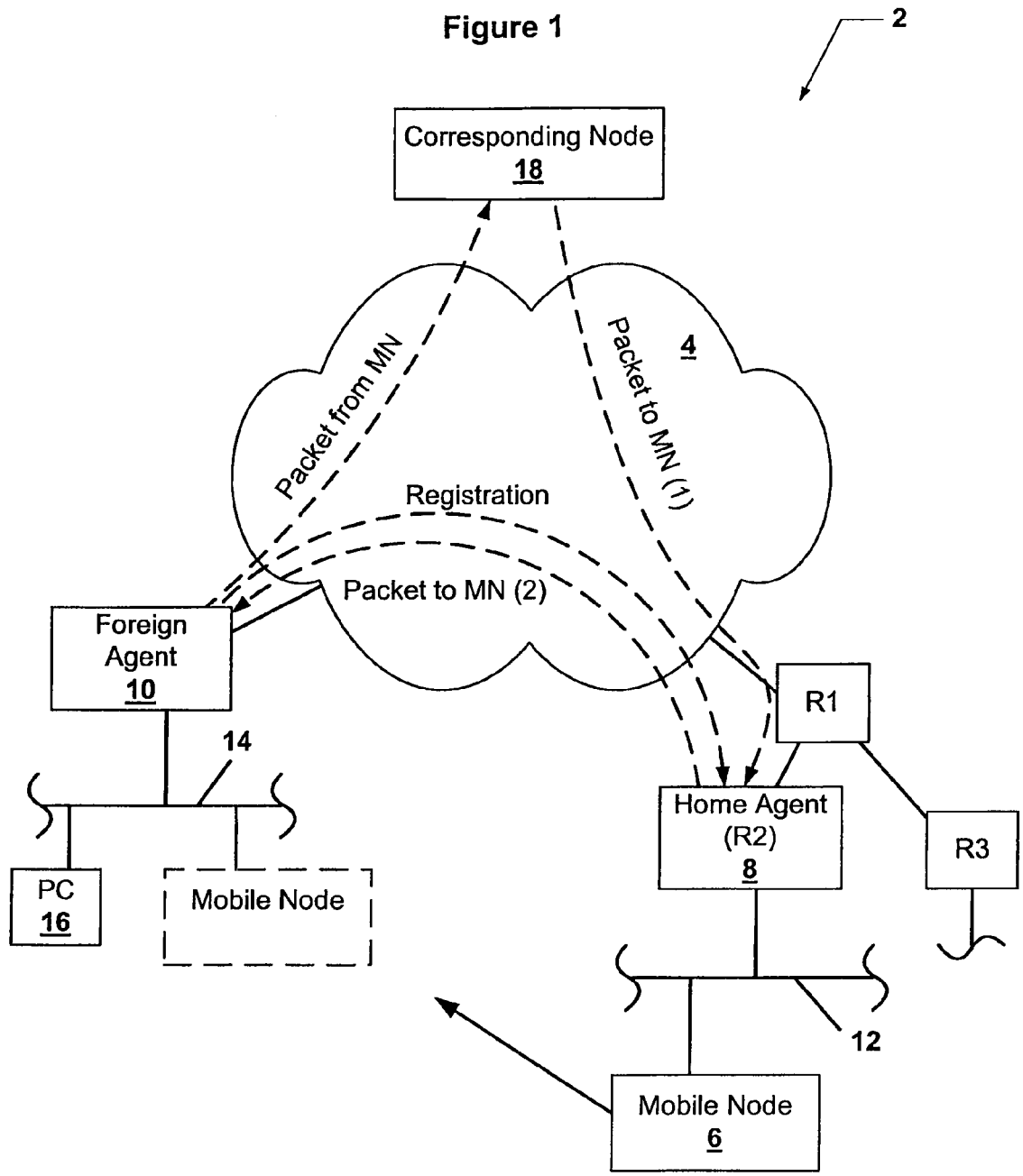
FIG. 1 is a diagram of a Mobile IP network segment and associated environment.

When an IP address is not assigned to the Mobile Node 6 during the registration process with the Home Agent 8 via any of the Foreign Agents, including 10, 202, and 204, the Home Agent 8 may update a mobility binding table and the Foreign Agents may update a visitor table. However, when the Mobile Node 6 postpones obtaining an IP address, a data path is not required to be established between the Home Agent 8 and the Foreign Agents. Details of the registration process at the Home Agent and the Foreign Agent are described with reference to FIGS. 3, 4 and 5. As described in FIG. 1, when the Mobile Node 6 has registered with the Home Agent via the Foreign Agent 10 and when assigned an IP address, the Home Agent 8 may forward encapsulated packets from the corresponding node 18 to a care-of-address of the Foreign Agent 10 (i.e. the Home Agent 8 "tunnels" the packets to the Foreign Agent 10). The tunnel is the data path between the Home Agent 8 and the Foreign Agent 10. The Foreign Agent 10 then strips the encapsulation and forwards the message to the Mobile Node 6 on network segment 14. Similarly, when the Mobile Node 6 has registered with the Home Agent 8 via the Foreign Agents 202 or 204 and the Mobile Node 6 has been assigned an IP address, packets may be forwarded to the Mobile Node 6 via the Foreign Agents 202 or 204 in the same manner as described above with reference to Foreign Agent 10.

As described above, a consumer may utilize some data services that automatically gather and send or "push" information to the Mobile Node 6 based on an information profile of the consumer. To contact the Mobile Node 6 in a Mobile IP environment, the push device 220, acting as a Corresponding Node, usually requires the Home Address, or IP address, of the Mobile Node 6 when it is attached to the home network segment 12. However, as described above, the Mobile Node 6, to conserve IP addresses, may roam from Foreign Agent to Foreign Agent without an assigned IP address. Thus, to contact the Mobile Node 6, the push device 220 may send a message to the Home Agent 8 of the Mobile Node 6 requesting an IP address of the Mobile Node 6. In this invention, the request for the IP address of the Mobile Node is denoted as a "name lookup." For example, when the push device 220 wants to send information to the Mobile Node 6 registered to the Home Agent 8 via the Foreign Agent 204, the push device 220 may send a name lookup message in the form of a name lookup packet over the Internet 4 to the Home Agent 8.

Typically, the name lookup packet sent to the Home Agent 8 contains a lookup name, which correlates to one or more Mobile Nodes that the push device 220 is trying to contact. Additionally, the name lookup packet may contain other information in some format including the name of the lookup requester (e.g. the push device 220) and the IP address of the lookup requester. The lookup name corresponding to one or more Mobile Nodes and the IP address of the Home Agent 8 corresponding to the one or more Mobile Nodes may be available to the push device 220 from a number of sources. For example, a central database accessible to the push device 220 may obtain one or more IP addresses associated with a particular Mobile Node (e.g., IP address of a Home Agent or IP address assigned to the Mobile Node) corresponding to a lookup name known to the push device 220. As another example, a consumer interested in the data services provided by the push device 220 may have provided information about the Mobile Nodes for which a pushed data service is desired, including the Home Agent and lookup name corresponding to each Mobile Node, during an earlier registration process.

The name lookup packet from the push device 220 may be sent directly via the Internet 4 to the Home Agent 8 or may be sent via an intermediate device including the domain name server (DNS) 222. As an example, the push device 220 may send an address look-up request for a particular lookup name corresponding to a particular Mobile Node to the DNS 222. When the DNS 222 receives the look-up request for the lookup name, a name lookup packet is sent to the Home Agent 8. When the Home Agent 8 receives the name lookup packet from the DNS 222 (or the push device 220), the Home Agent 8 may look up the lookup name in a table, stored in a memory device of some type in or associated with the Home Agent 8, which maps the lookup name identified in the name lookup packet to one or more Mobile Node identifiers. Using the Mobile Node identifier, the Home Agent 8 may determine the IP address of the Mobile Node, including Mobile Node 6, corresponding to the Mobile Node identifier when the Mobile Node is currently assigned an IP address. When the Mobile Node corresponding to the Mobile Node identifier does not have an assigned an IP address, the Home Agent may initiate a process to assign the Mobile Node, including Mobile Node 6, an IP address. For example, when the Mobile Node 6 has registered with the Home Agent 8 via the Foreign Agent 204 on the foreign network segment 212 without an assigned IP address, the Home Agent 8 may send a lookup notification message to the Mobile Node 6 via the Foreign Agent 204 requesting that the Mobile Node 6 register with the Home Agent 8 so that it may be assigned an IP address. As another example, when the Mobile Node 6 has registered with the Home Agent 8 via the Foreign Agent 204 on the foreign network segment 212 without an assigned IP address, the Home Agent 8 may send a lookup notification message to the Mobile Node 6 via the Foreign Agent 204 with an IP address assigned to the Mobile Node 6. Details of this process are described with reference to FIGS. 6, 7, 8, 9 and 10.

After determining the IP address of the Mobile Node (or IP addresses when the lookup name corresponds to more than one Mobile Node) corresponding to the lookup name in the name lookup message previously received from the push device 220 or the DNS 222, the Home Agent 8 sends a lookup reply to the push device 220 or DNS 222 indicating the one or more IP associated with the lookup name. For instance, when the lookup reply is sent to the DNS, the one or more IP addresses corresponding to the lookup name are then sent from the DNS 222 to the push device 220. With the IP address of the Mobile Node, the push device 220 may then push information to the paged Mobile Node as described above with reference to FIG. 1. For example, when the Mobile Node 6 is registered with the Home Agent 8 via the Foreign Agent 204 and the Mobile Node 6 has been assigned an IP address, the push device sends data packets to the Home Agent 8, the Home Agent 8 encapsulates the data packets and sends the packets to the Foreign Agent 204, and the Foreign Agent 204 decapsulates the packets and sends the packets to the Mobile Node 6.

An advantage of enabling a lookup of a Mobile Node without an assigned IP address is that the Mobile Node is not assigned an IP address until it is paged by a push device. Thus, many consumers utilizing push data services may carry a number of devices capable of receiving pushed information without continuously utilizing a large number of IP addresses. When the amount of pushed information is small, a Mobile Node receiving information from a push device may only need an IP address for a short amount of time. Thus, the IP addresses available to the Home Agent may be utilized more efficiently.

Figure 3:
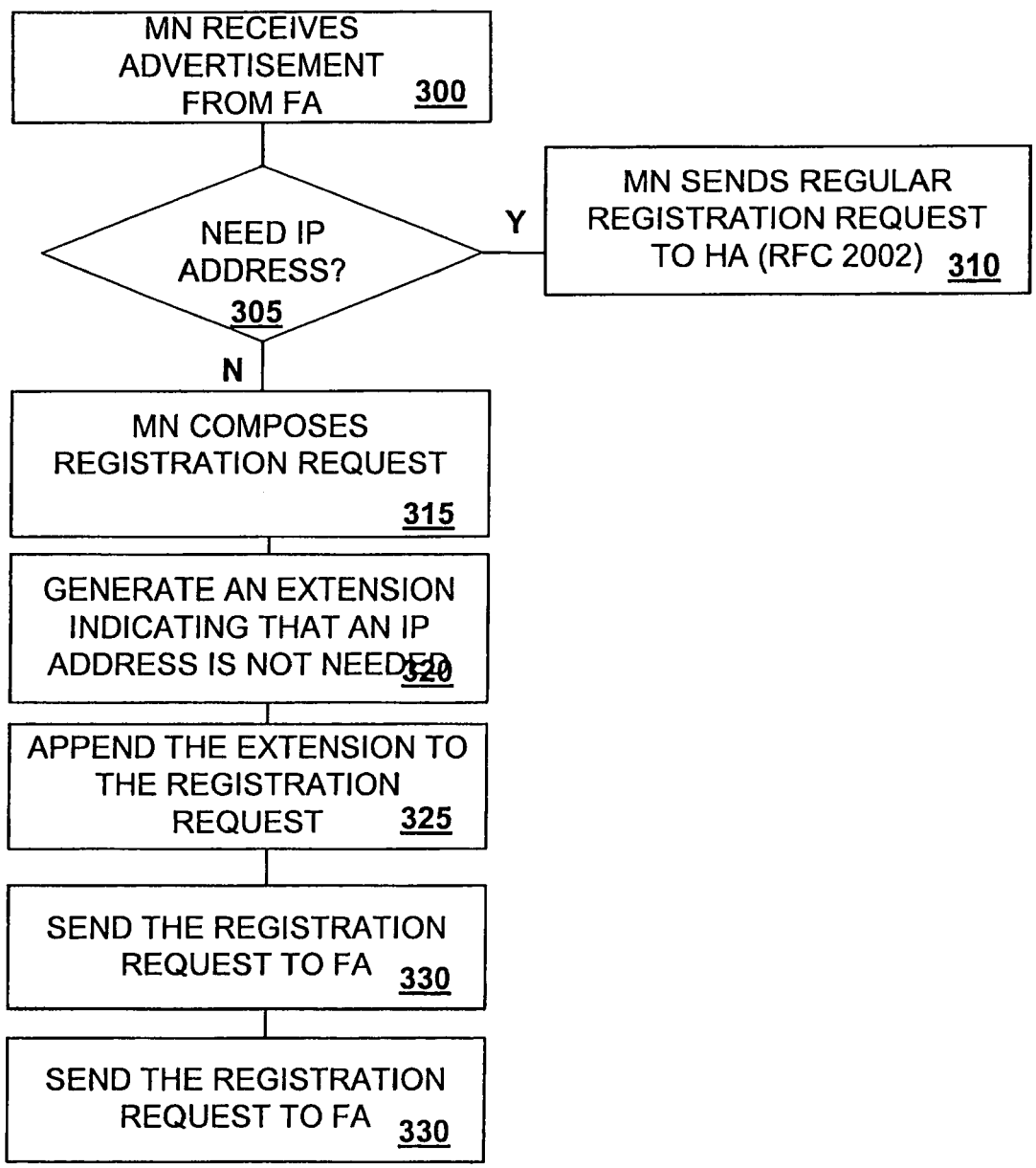
FIG. 3 is a flow diagram illustrating process steps performed by a Mobile Node registering with a home agent when an address is not required.

FIG. 3 is a flow diagram illustrating process steps performed by a Mobile Node registering with a home agent when an IP address is not required by the Mobile Node. In step 300, the Mobile Node (MN) receives an advertisement from the Foreign Agent (FA). The advertisement contains information about the Foreign Agent such that the Mobile Node may compose a registration request to a Home Agent via the Foreign Agent. For example, the advertisement typically contains the care-of-address of the Foreign Agent. In step 305, the Mobile Node determines whether it requires an IP address. For example, the Mobile Node may be roaming and receiving advertisements from different Foreign Agents but otherwise may be in a dormant state. In the dormant state, the Mobile Node may not be sending or receiving any information which requires the Mobile Node to have an assigned IP address. In step 310, when the Mobile Node requires an IP address, a standard registration request packet is composed and sent to the Home Agent (HA) via the Foreign Agent in step 310 according to protocols described in RFC 2002.

In step 315, when the Mobile Node does not need an assigned IP address, the Mobile Node composes a registration request packet. However, the Mobile Node indicates in the registration request packet that an IP address is not required by the Mobile Node at that time. For example, the registration request packet may be a standard registration request packet that includes an address extension or indicator indicating that an IP address is not needed i.e. "no address allocation." Thus, in steps 320 and 325, such an address extension is generated (step 320) and appended to the registration request packet (step 325). For example, the "no address allocation" address extension may include one or more bits such that when the one or more bits are in a first state, the bits indicate that an IP address is not needed. Otherwise the one or more bits indicate an IP address is needed. In step 330, the registration request packet with the address extension is sent to the Foreign Agent described in step 300 which forwards the message to the Home Agent.

Figure 4:
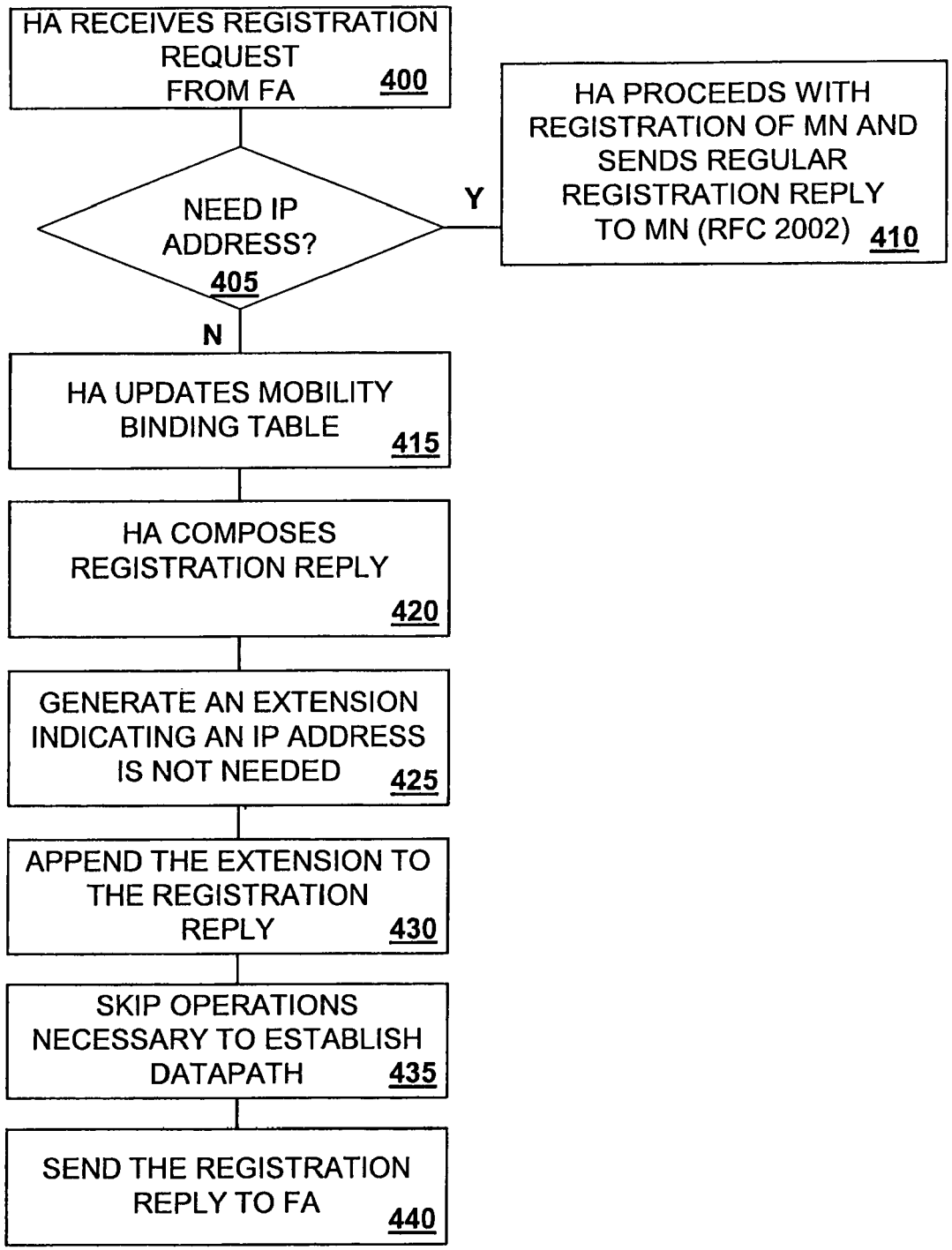
FIG. 4 is a flow diagram illustrating process steps performed by a Home Agent processing a registration request by the Mobile Node when an address is not required and generating the registration reply to Mobile Node.

FIG. 4 is a flow diagram illustrating process steps performed by a Home Agent processing a registration request by the Mobile Node when an address is not required and generating the registration reply to Mobile Node. In step 400, the Home Agent receives a registration request packet from the Foreign Agent requesting the registration of a Mobile Node. In step 405, the Home Agent checks the registration request packet for an address extension indicating whether the Mobile Node needs an IP address i.e. the "no address allocation" address extension. In step 410, when an IP address is needed or an address extension is attached to the registration request packet, the Home Agent registers the Mobile Node and sends a registration reply packet to the Mobile Node via the Foreign Agent according to RFC 2002. In one embodiment, an address extension indicating that an IP address is needed by the Mobile Node may be generated and appended to the registration reply packet generated in step 410.

When the Mobile Node does not require an IP address (e.g., the Mobile Node is in a dormant state), in step 415 the Home Agent updates a mobility binding table with the care-of-address of the mobile node but does not assign an IP address to the Mobile Node. Also, in step 420 the Home Agent skips the operations needed to establish a data path between the Home Agent and the Foreign Agent. For example, when the Mobile Node is assigned an IP address, a tunnel is created between the Home Agent and the Foreign Agent such that encapsulated packets from a corresponding node may be forwarded to the Mobile Node via the tunnel to the Foreign Agent. When the Mobile Node is not assigned an IP address, the tunnel between the Home Agent and the Foreign Agent is not created.

In step 425 the Home Agent composes a registration reply packet. In this registration reply packet, the Home Agent may indicate that an IP address is not needed by the Mobile Node and therefore an IP address has not been assigned by the Home Agent to the Mobile Node. For example, an address extension or indicator indicating that an IP address is not needed by the Mobile Node (a "no address assigned" address extension) may be generated and appended to the registration request packet in steps 430 and 435. The address extension may include one or more bits such that when the one or more bits are in a first state, the bits indicate that an IP address is not needed. Otherwise the one or more bits that indicate an IP address is needed. The "no address assigned" address extension may be the same format or a different format from the address extension appended to the registration request packet by the Mobile Node. In step 440, the registration reply packet with the address extension is sent to the Foreign Agent described in step 400 which forwards the message to the Home Agent.

Figure 5:
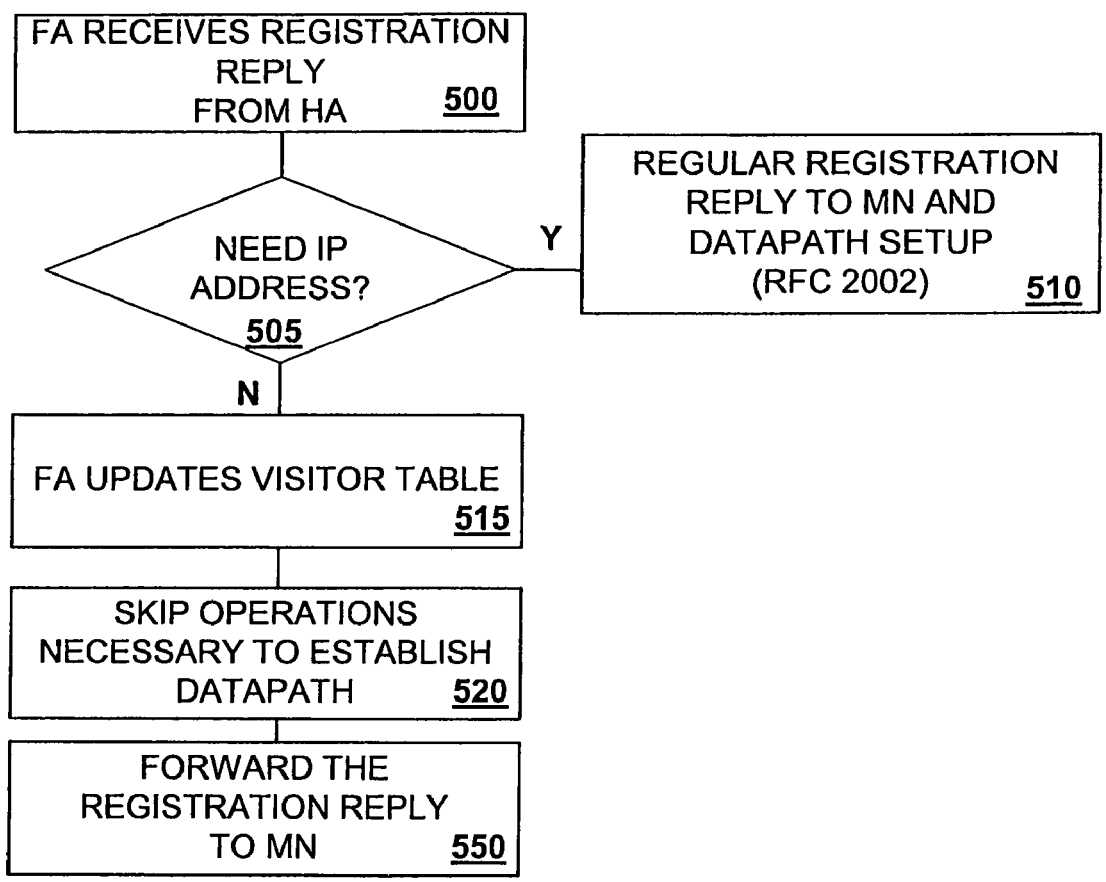
FIG. 5 is a flow diagram illustrating process steps performed by a Foreign Agent processing a registration reply without an address by the Home Agent and relaying the registration reply to the Mobile Node.

FIG. 5 is a flow diagram illustrating process steps performed by a Foreign Agent processing a registration reply received from the Home Agent and relaying the registration reply to the Mobile Node. In step 500, the Foreign Agent receives a registration reply packet from the Home Agent for the registration of a Mobile Node. In step 505, the Foreign Agent checks the registration reply packet for an "no address assigned" address extension or indicator indicating whether the Mobile Node needs an IP address (e.g., whether the Home Agent has allocated an IP address to the Mobile Node). In step 510, when an IP address is needed or an address extension is attached to the registration request packet, the Foreign Agent registers the Mobile Node and establishes a data path between the Foreign Agent and the Home Agent. The Foreign Agent forwards the registration reply packet to the Mobile Node and establishes a data path according to RFC 2002. The data path allows encapsulated packets sent by the Home Agent to be received by the Foreign Agent and forwarded to the Mobile Node.

In step 515, when the Foreign Agent determines that the Mobile Node does not require an IP address, the Foreign Agent updates a visitor table. In the visitor table, the Mobile Node is assigned an identifier of some type and the Home Agent of the Mobile Node is recorded to indicate that the Mobile Node is visiting the Foreign Agent. In step 520, the steps to establish the data path between the Home Agent and the Foreign Agent are skipped. In step 550, the registration reply is forwarded to the Mobile Node.

Figure 6:
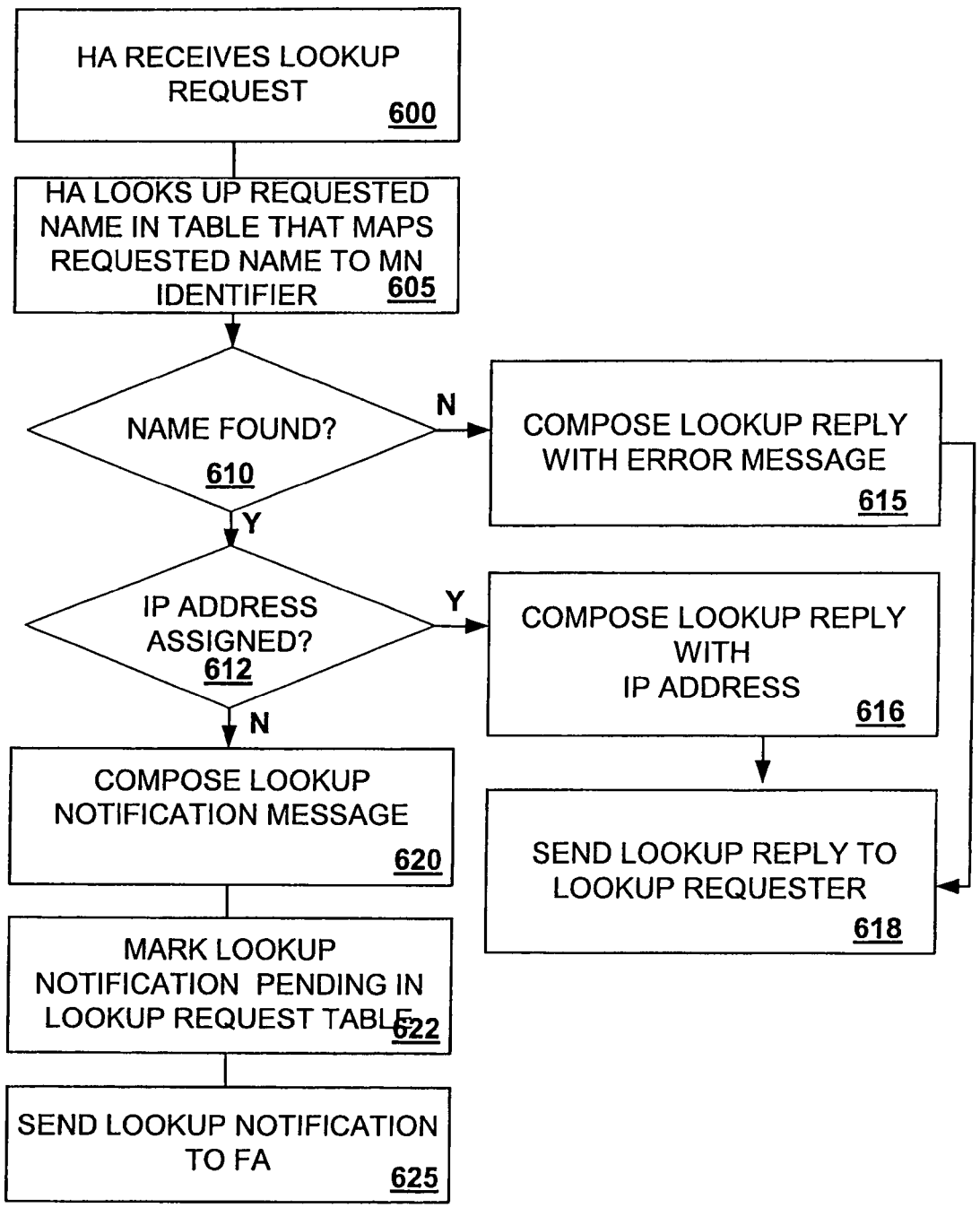
FIG. 6 is a flow diagram illustrating process steps performed by a Home Agent to respond to a name lookup by a Lookup Requester.

FIG. 6 is a flow diagram illustrating process steps performed by a Home Agent to respond to a name lookup by a Lookup Requester. In step 600, the Home Agent receives a name lookup packet from some device. As described above with reference to FIG. 2, the name lookup packet may contain a lookup name, the name of the device requesting the lookup (lookup requester) and an IP address for the lookup requester. The lookup requester may be a push device 220, a domain name server 222 or some other device. Additionally, when the name lookup packet is from a domain name server the packet may be consistent with a protocol used by a domain name server. An example of a possible name lookup message is described in the context of a domain name server in the "Mobile IP" reference described above.

Before processing the name lookup message, the Home Agent may perform a number of operations that allow name lookup messages to be filtered. For example, the name lookup packet may contain some information allowing the Home Agent to authenticate the name lookup packet. As another example, the Home Agent may store a list of lookup requester names corresponding to devices authorized to send name lookup messages to the Home Agent. After receiving a name lookup packet with a lookup requester name, the Home Agent may compare the lookup requester name in the name lookup packet to the list of lookup requesters authorized to request lookups from the Home Agent. When a lookup requester name is not found on the list of authorized lookup requesters, the Home Agent may compose a lookup reply message with an error indicator indicating that the requested lookup is unavailable and, may send the lookup reply to the lookup requester that sent the name lookup packet. A lookup reply with an error indicator indicating the requested lookup is unavailable may also be sent to the lookup requester when the Home Agent is unable to authenticate the name lookup packet.

In step 605, the Home Agent may look up the lookup name in a lookup name table that maps the lookup name to one or more Mobile Node identifiers corresponding to one or more Mobile Nodes. The lookup name table may be stored on a memory device associated with the Home Agent. For example, the lookup name in the name lookup packet and stored in the lookup name table may identify a user.device, including user.phone, user.computer, and user.pager, etc., where the user is a user name associated with the user of the device. More particularly, each user.device may be mapped to a mobile node identifier. Thus, the Home Agent searches the lookup name table to determine whether there is a Mobile Node associated with the lookup name registered with the Home Agent. When the device is not specified in the lookup name (e.g., the lookup name is only a user name), the Home Agent may search the lookup name table to determine whether one or more Mobile Nodes are associated with the user specified by the lookup name. The example given above is only for illustrative purposes. Many different formats of a lookup name and a lookup name table are possible in embodiments of this invention.

In step 610, when the lookup name is not found in the lookup name table, the Home Agent composes a lookup reply message. The lookup reply message may include an error message indicating that the requested lookup name is unavailable. In step 618, the lookup reply message is sent to the lookup requester. In step 612, when the lookup name is found in the lookup name table, the Home Agent determines whether the Mobile Node corresponding to the lookup name is currently assigned an IP address by the Home Agent. This step may be repeated when the lookup name corresponds to more than one Mobile Node. When the Mobile Node is assigned an IP address, in step 616, a lookup reply message including the IP address of the Mobile Node requested in the name lookup is composed. In step 618, the lookup reply message is sent to the lookup requester. An example of a lookup reply message is described in the context of a domain name server in the "Mobile IP" reference described in the Background section.

In step 620, when an IP address is not assigned to one or more of the Mobile Nodes corresponding to the lookup name, the Home Agent composes a lookup notification packet to be sent to the Mobile Node. In one embodiment, the lookup notification packet contains information requesting the Mobile Node to send a registration request to Home Agent so that the Mobile Node may be assigned an IP address. For example, the lookup notification packet may contain a registration request indicator requesting the Mobile Node to register with the Home Agent when the indicator is in a first state. In another embodiment, the lookup notification packet contains an IP address and may contain other information such as a registration lifetime assigned to the Mobile Node by the Home Agent. An example of a lookup notification packet without an IP address is described with reference to FIG. 10A. An example of a lookup notification packet with an IP address is described with reference to FIG. 10B. The corresponding entry in the name lookup table may then be marked to indicate that a lookup notification is pending as shown in step 622. In step 625, the lookup notification packet is sent to the Mobile Node via the Foreign Agent.

An advantage of the first embodiment, which does not include an IP address and lifetime in the lookup notification packet, is backward compatibility with existing mobile IP implementations. In other words, the sending of the lookup notification packet merely initiates the registration process by the Mobile Node. An advantage of the second embodiment, which includes an IP address and lifetime in the lookup notification packet, is the elimination of one step in the looking up process. In the first embodiment, the Mobile Node sends a standard registration request packet to acknowledge the lookup notification packet sent by the Home Agent. Then, the Home Agent sends a registration reply with an IP address to the Mobile Node. Thus, the first embodiment requires three steps. In the second embodiment, the Mobile Node sends a lookup acknowledgement packet to the Home Agent in response to the lookup notification packet. The lookup acknowledgement from the Mobile Node may be sent to the Home Agent via the Foreign Agent or directly to the Home Agent. Thus, the second embodiment requires only two steps. However, the second embodiment may not be backwards compatible with previous mobile IP implementations.

Before or after sending the lookup notification packet to the Mobile Node, the lookup notification message may be marked pending in a name lookup table (step 622). The name lookup table is used by the Home Agent to track lookup notification packets sent by the Home Agent. As an example, an entry in the name lookup table may include different combinations of the following seven items: 1) the lookup requester name, 2) the IP address of the lookup requester, 3) a lifetime assigned to the Mobile Node, 4) a Mobile Node identifier identifying the Mobile Node, 5) the care-of-address of the Foreign agent associated with the Mobile Node, 6) an IP address assigned to the Mobile Node in the lookup notification packet, 7) the lookup name and 8) a unique message identifier associated with the lookup notification packet.

Figure 7:
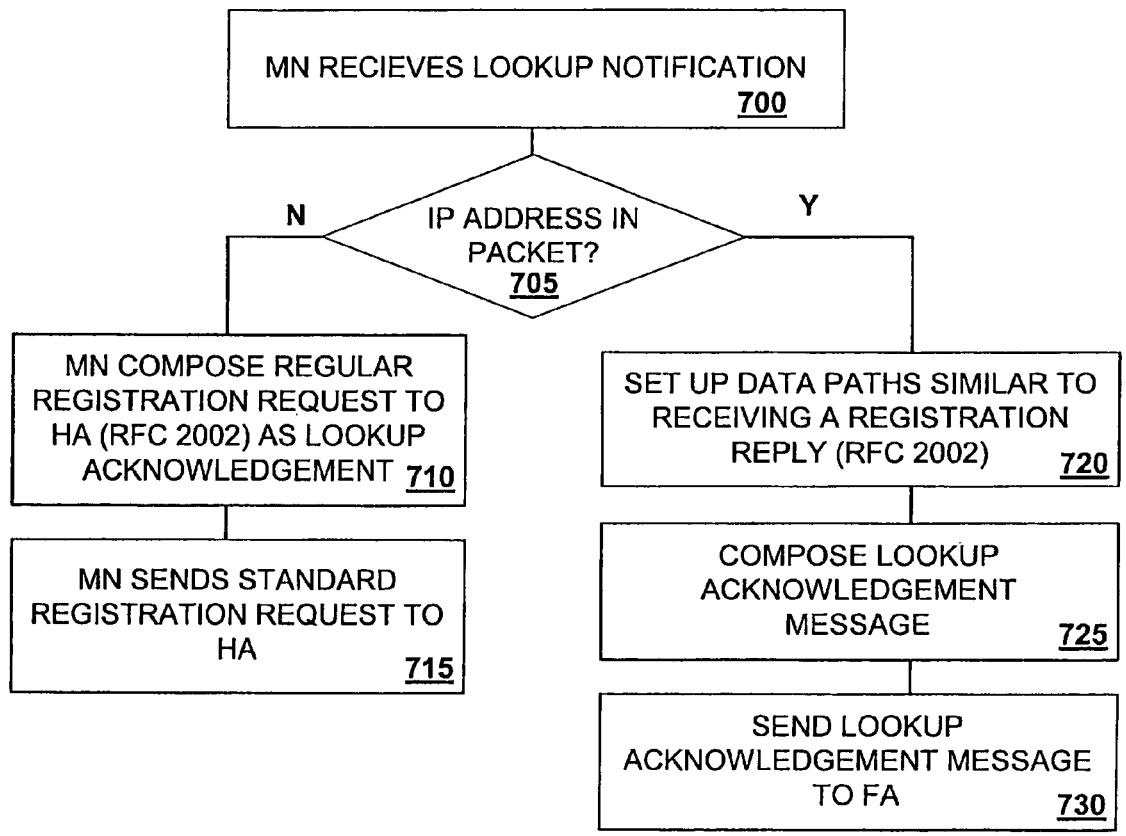
FIG. 7 is a flow diagram illustrating process steps performed by a Mobile Node after receiving a lookup notification packet from a Home Agent.

FIG. 7 is a flow diagram illustrating process steps performed by a Mobile Node after receiving a lookup notification packet from a Home Agent. In step 700, the Mobile Node receives a lookup notification packet from the Home Agent forwarded to the Mobile Node by the Foreign Agent. In step 705, the Mobile Nodes checks whether the lookup notification message contained an IP address assigned to the Mobile Node. In step 720, when an IP address has been assigned to the Mobile Node, the lookup notification is processed in a manner similar to when a registration reply is received from the Home Agent according to RFC 2200 (e.g. set up data paths needed for communication). The lookup notification packet may include a maximum registration lifetime. In step 725, the Mobile Node composes a lookup acknowledgement packet. More particularly, the lookup acknowledgement packet may include a registration lifetime selected (e.g., negotiated) by the Mobile Node which is less than or equal to the registration lifetime specified by the Home Agent. In step 730, the lookup acknowledgement packet is sent to the Home Agent via the Foreign Agent to acknowledge that the lookup notification packet and therefore the associated IP address has been received by the Mobile Node. There may be situations when the Mobile Node has already roamed to another Foreign Agent and therefore may be incapable of receiving the lookup notification packet. In these instances, steps 725 and 730 are not performed. Since the lookup acknowledgement message is not received by the Home Agent when this occurs, the Home Agent will not forward data packets to the Mobile Node.

In step 705, when the lookup notification packet does not include an IP address, the Mobile Node composes a registration reply to the Home Agent according to RFC 2002 as a lookup acknowledgement message. Thus, the registration process is the similar to a Mobile Node attempting to register with a Home Agent after receiving an advertisement from a Foreign Agent. In step 715, the standard registration request packet is sent to the Home Agent via the Foreign Agent. The Home Agent may then send a registration reply packet in response to the registration request.

In FIG. 7, two other potential embodiments involve removing step 705. Thus, the Mobile Node may process all lookup notifications from the Home Agent according to steps 700, 710 and 715 or the Mobile Node may process all the lookup notification packets according to steps 700, 720, 725, and 730. Such modifications may also be made to the corresponding flow diagrams associated with the Mobile Node, the Home Agent, and the Foreign Agent processes. As described above with reference to FIG. 6, an advantage of including an assigned IP address in the lookup notification packet is that the number of steps in the looking up process may be reduced.

FIGS. 8A, 8B are flow diagrams illustrating the process steps performed by a Foreign Agent in response to a name lookup. In step 800, the Foreign Agent receives a lookup notification packet from the Home Agent. In step 805, the Foreign Agent forwards the lookup notification message to the Mobile Node. In step 810, the Foreign Agent receives a lookup acknowledgement message from the Mobile Node. In step 815, when the lookup notification message does not include an IP address for the Mobile Node, the Mobile Node sends a lookup acknowledgment that takes the form of a registration request to the Home Agent as shown at block 820. However, when the lookup notification message does include an IP address, the Mobile Node sends a lookup acknowledgement acknowledging receipt of the IP address. An example of a lookup acknowledgement message is described in reference to FIG. 10C. When the Foreign Agent receives this lookup acknowledgement, the Foreign Agent forwards the lookup acknowledgement packet to the Home Agent. In step 815, when the lookup acknowledgement message includes the IP address of the Mobile Node assigned to the Mobile Node by the Home Agent (as obtained from the lookup notification packet), the Foreign Agent sets up the data path between the Home Agent and the Foreign Agent and between the Foreign Agent and the Mobile Node in step 825. In step 830, the lookup acknowledgement packet sent from the Mobile Node is forwarded to Home Agent.

In FIG. 8, two other potential embodiments involve removing step 815. Thus, the Foreign Agent may process all lookup notifications from the Mobile Node according to steps 810 and 820 or the Foreign Agent may process all the lookup notification packets according to steps 810, 825 and 830. This simplification may reduce the complexity of implementing the name lookup process in a Foreign Agent.

Figure 9A:
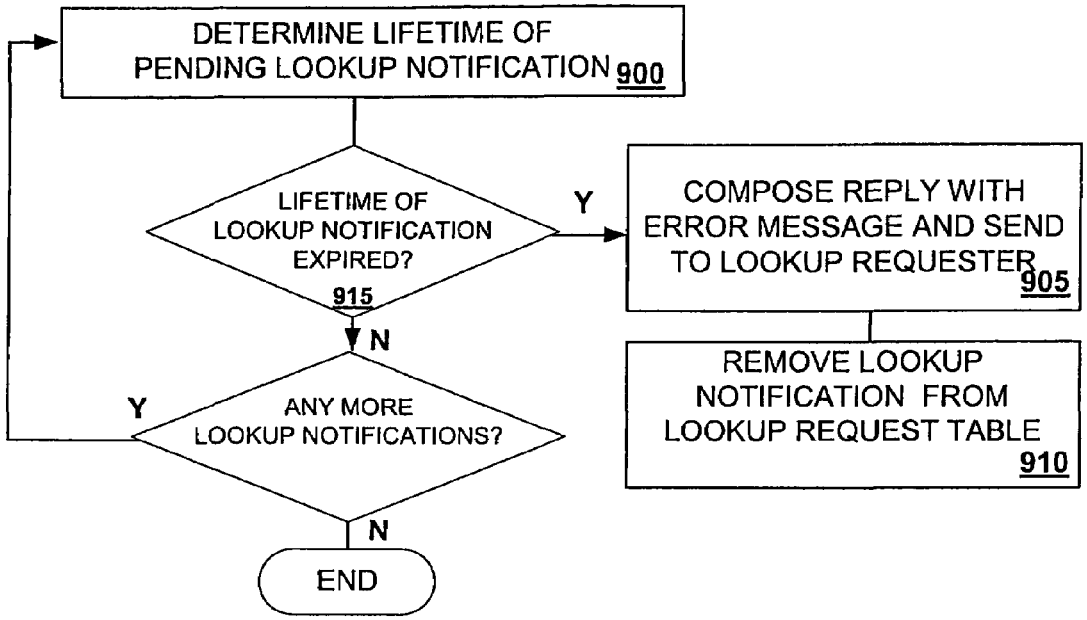
FIGS. 9A and 9B are flow diagrams illustrating the process steps performed by a Home Agent to check the lifetime of a name lookup and process a lookup acknowledgement message.
Figure 9B:
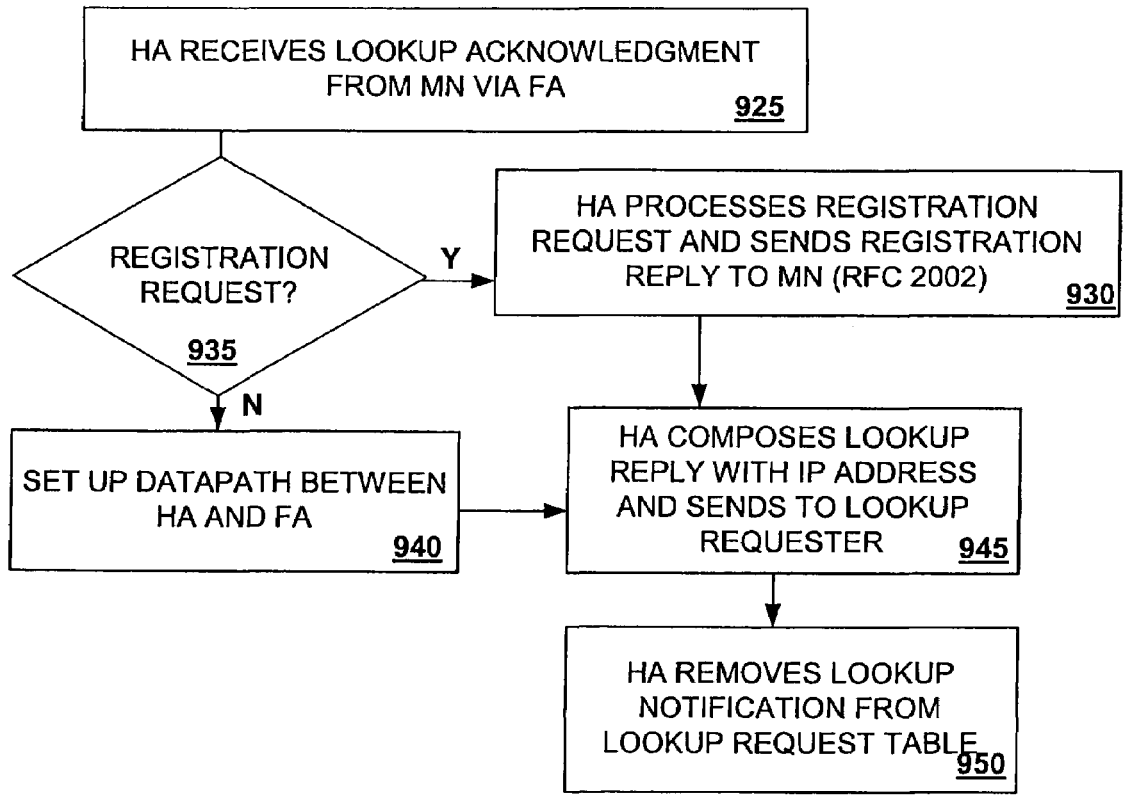

FIGS. 9A and 9B are flow diagrams illustrating the process steps performed by a Home Agent to check the lifetime of a name lookup and process a lookup acknowledgement message. As described above with reference to FIG. 6, each lookup notification packet may include a lifetime that is associated with the pending lookup notification and monitored by the Home Agent. The lifetime for the lookup notification packet may also be stored in a name lookup table. When the Mobile Node is unavailable, the Home Agent will not receive a lookup acknowledgement packet from the Mobile node in response to the lookup notification packet. Thus, it may be preferable for the Home Agent to determine the lifetime of the pending lookup notification from the lookup notification packet in step 900. After a predetermined amount of time according to the lifetime assigned to the lookup notification, the Home Agent may again try to lookup the Mobile Node, as described with reference to FIG. 6, or send a lookup reply to the lookup requester indicating the Mobile Node is unavailable or can not be reached.

A need for this checking the lifetime of the lookup notification packet occurs when an IP address is included in the lookup notification packet to the Mobile Node. While the lifetime of the lookup notification packet is not expired, the IP address assigned to the Mobile Node may not be used by another device although the Mobile Node may not respond to the lookup notification packet. Thus, tracking the lifetime of the lookup notification packets may aid in more efficiently using IP addresses available to the Home Agent.

In step 915, the time remaining on the pending lookup notification is compared against a minimum time value. When the time remaining is below the time value, in step 905 a lookup reply packet is composed with an error message indication the lookup name is unavailable and sent to the lookup requester. In step 910, the entry in the name lookup table corresponding to lookup notification packet with a time remaining below a minimum value is removed from the table. In step 920, when the time remaining on the lookup notification packet is above a minimum value, the Home Agent checks the name lookup table for any other pending lookup notifications.

In step 925, the Home Agent receives a lookup acknowledgement packet (e.g., registration request packet) from the Mobile Node via the Foreign Agent. In step 935, the Home Agent determines whether the lookup acknowledgement is a registration request. In step 940, when a lookup acknowledgement packet is received in response to a lookup notification packet including an IP address (e.g., when the lookup acknowledgement packet is not a registration request packet), the Home Agent sets up a data path between the Home Agent and the Foreign Agent allowing encapsulated packets from a Corresponding Node to be forwarded to the Mobile Node via the Foreign Agent. When the lookup acknowledgement packet is a registration request in response to a lookup notification packet, in step 930, the Home Agent processes the registration request according to RFC 2002. More particularly, the Home Agent assigns the Mobile Node an IP address and composes a registration reply packet which is forwarded to the Mobile Node via the Foreign Agent. In both instances, a lookup reply may be sent to a lookup requester. Thus, as shown in step 945, the Home Agent composes a lookup reply with an IP address assigned to the Mobile Node and sends the lookup reply to the lookup requester. In step 950, the Home Agent removes the pending lookup notification from the name lookup table.

In FIG. 9B, two other potential embodiments involve removing step 935. Thus, the Home Agent may process all lookup acknowledgements from the Mobile Node according to steps 925, 930, 945 and 950 or the Home Agent may process all the lookup acknowledgements from the Mobile Node according to steps 925, 940, 945 and 950. Using one or the first or second embodiment rather than both may reduce the complexity of implementing the name lookup process in a Home Agent.

Figure 10A:
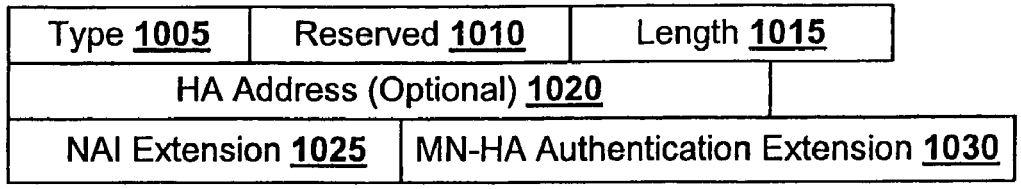
FIG. 10A is a block diagram illustrating an example of a lookup notification message without an IP address according to an embodiment of the invention.

FIG. 10A is a block diagram illustrating an example of a lookup notification message without an IP address according to an embodiment of the invention. The type field 1005 may indicate the message is a lookup notification message with or without an IP address. The reserved field 1010 is reserved for future use. The length field 1015 provides the size of the Mobile IP fields measured in bytes. The Home Agent (HA) Address field, which is optional, may include the IP address of the Home Agent. The Network Access Identifier field (NAI) 1025 contains a User Identification (see RFC 2486) submitted by a client during point to point protocol authentication. Thus, when a client is authenticated based upon the NAI, an IP address may be allocated for use by the client. The Mobile Node Home Agent Authentication Extension field (MN-HA) 1030 field is typically used to prove that the message was sent by the node that claims to have sent it.

Figure 10B:
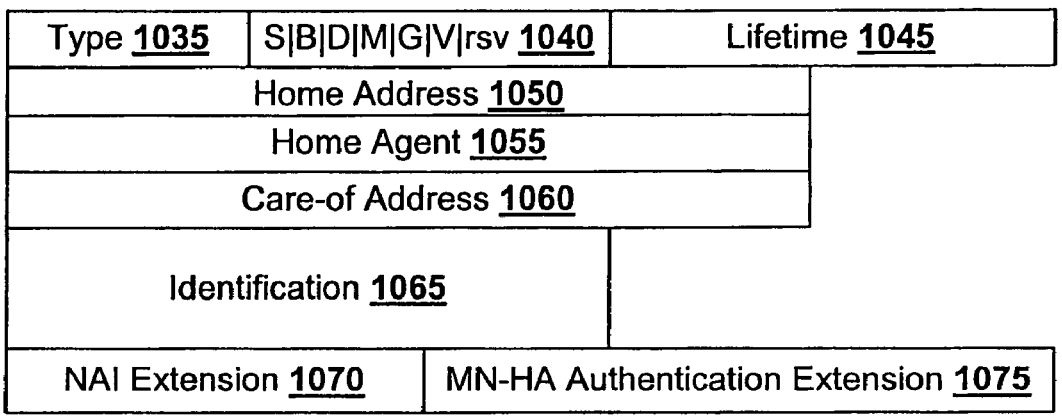
FIG. 10B is a block diagram illustrating an example of a lookup notification message with an IP address according to an embodiment of the invention.

FIG. 10B is a block diagram illustrating an example of a lookup notification message with an IP address according to an embodiment of the invention. The S|B|D|M|G|V|rsv field 1040 provides information required for routing of the lookup notification message (see RFC 2002). The lifetime field 1045 may be used by the Foreign Agent to set the number of seconds the registration will last before it expires. The Home Address field 1050 may provide the Home IP address of the Mobile Node. The Home Agent field 1055 may provide the IP address of the Home Agent. The Care-of Address field 1060 may provide the IP address of the Foreign Agent. The identification field 1065 is typically used to permit a Mobile Node to match a name lookup message with the corresponding replies.

Figure 10C:
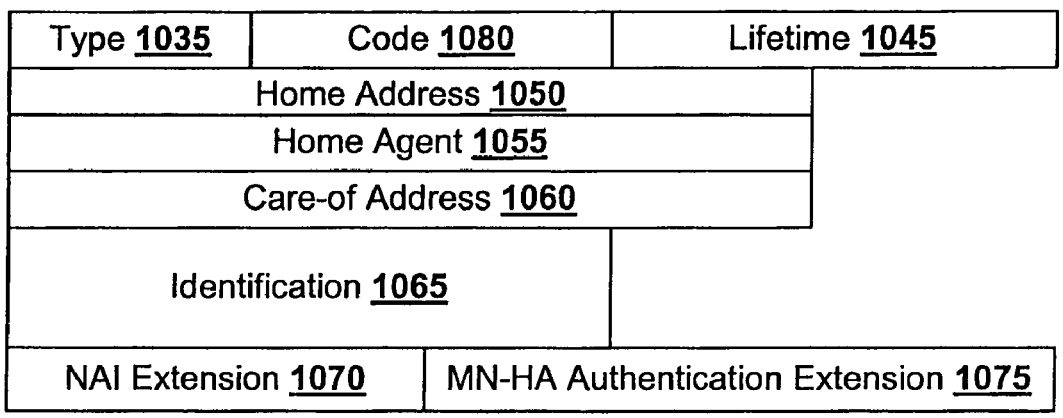
FIG. 10C is a block diagram illustrating an example of a lookup acknowledgement message from the Mobile Node to the Home Agent according to an embodiment of the invention.

FIG. 10C is a block diagram illustrating an example of a lookup acknowledgement message from the Mobile Node to the Home Agent according to an embodiment of the invention. The fields used in the lookup acknowledgement message are similar to the name lookup message in FIG. 10B. The Code field 1080 indicates whether the name lookup was accepted or rejected.

The present invention provides methods and apparatus permitting a Home Agent to process a name lookup from a device that requests contact with a Mobile Node. More particularly, the above-described embodiments enable a Foreign Agent or other router to cause a Mobile Node to obtain an IP address. In accordance with one embodiment, this initiates registration by the Mobile Node with the Home Agent in response to a lookup notification message received by the Mobile Node from the Home Agent. Once the paged Mobile Node is registered, the device, which initiated the lookup, may send information to the Mobile Node.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (Home Agent, Foreign Agent, Anchor Foreign Agent and/or node) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention may be specially configured routers such as specially configured router models 2500, 2600, 3600, 4000, 4500, 4700, 7200, and 7500 available from Cisco Systems, Inc. of San Jose, Calif. A general structure for some of these machines will appear from the description given below.

Generally, the registration technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid registration system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the registration systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Figure 11:
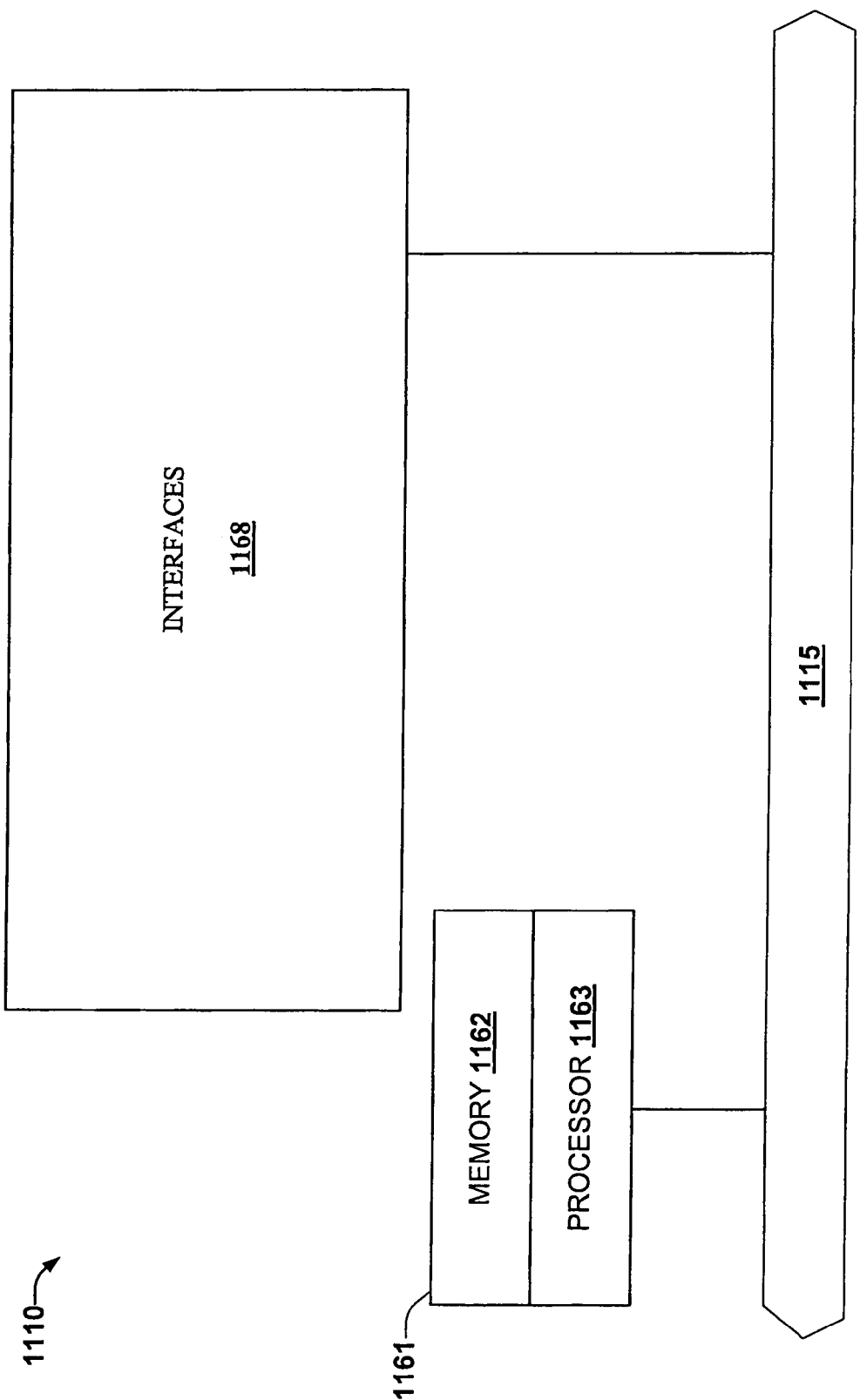
FIG. 11 is a block diagram of a network device that may be configured to implement aspects of the present invention.

Referring now to FIG. 11, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 11 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for registration and routing functions described herein. The program instructions may control the operation of an operating system and/or one or more applications, for example. The memory or memories may also be configured to store tables such as mobility binding and visitor tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a computer readable medium carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to Mobile Nodes on remote network segments can be used as well. For example, bridges or other less intelligent packet switches may also employ the standby protocol of this invention. Accordingly, the present embodiments are to be considered as illustrative and not restrictive, and the invention is not to be limited to the details given herein, but may be modified within the scope and equivalents of the appended claims.

What is claimed is:

1. In a Home Agent that supports Mobile IP, a method of registering a Mobile Node without assigning an IP address, the method comprising:
   determining whether the Mobile Node requires an IP address using a first indicator in a registration request packet;
   when it is determined that the Mobile Node does not require an IP address, generating a second indicator indicating that an fP address is not assigned to the Mobile Node, appending the second indicator to a registration reply packet and sending the registration reply packet; and
   when it is determined that the Mobile Node requires an IP address, assigning an IP address to the Mobile Node and sending to the Mobile Node a registration reply packet containing the IP address.

2. In a Home Agent that supports Mobile IP, a method of registering a Mobile Node without assigning an IP address, the method comprising:
   determining whether the Mobile Node requires an IP address using a first indicator in a registration request packet;
   when it is determined that the Mobile Node does not require an IP address, sending a registration reply packet containing a second indicator indicating that an IP address is not assigned to the Mobile Node; and
   when it is determined that the Mobile Node requires an IP address, assigning an IP address to the Mobile Node and sending to the Mobile Node a registration reply packet containing the IP address;
   wherein the first indicator and the second indicator have an identical format.

3. In a Home Agent that supports Mobile IP, a method of looking up a Mobile Node wherein the Mobile Node has previously registered with the Home Agent to notify the Home Agent that the Mobile Node has roamed to a specified Foreign Agent, the method comprising:
   receiving a name lookup packet for a name lookup from a lookup requester, wherein the name lookup packet includes a lookup name;
   composing a lookup notification packet, the lookup notification packet indicating that a name lookup for a Mobile Node corresponding to the lookup name in the name lookup packet has been received by the Home Agent;
   sending the lookup notification packet to the Mobile Node via a Foreign Agent, wherein the lookup notification packet includes an indicator requesting that the Mobile Node send a lookup acknowledgement packet to the Home Agent;
   receiving a lookup acknowledgement packet from the Mobile Node via the Foreign Agent, the lookup acknowledgement packet corresponding to the lookup notification packet; and
   sending a lookup reply packet to the lookup requester indicating a status of the name lookup.

4. The method of claim 3, further comprising:
   authenticating the name lookup packet from the lookup requester.

5. The method of claim 3, wherein the name lookup packet includes a lookup requester name.

6. The method of claim 5, further comprising:
   prior to composing the lookup notification packet,
   looking up the lookup requester name in a lookup requester table; and
   when the lookup requester name is not found in the lookup requester table, composing the lookup reply packet and sending the lookup reply packet to the lookup requester wherein the lookup reply packet contains an error indicator indicating the lookup name is unavailable.

7. The method of claim 3, wherein the lookup requester is a domain name server.

8. The method of claim 3, wherein the lookup name corresponds to one or more Mobile Nodes.

9. The method of claim 3, wherein the lookup name is compatible with a protocol used by a domain name server.

10. The method of claim 3, wherein the lookup name refers to one or more physical devices capable of receiving the lookup notification packet.

11. The method of claim 3, wherein the lookup name refers to a user of one or more physical devices capable of receiving the lookup notification packet.

12. The method of claim 3, further comprising:
after receiving the lookup acknowledgement packet from the Mobile Node via the Foreign Agent,
establishing a data path between the Home Agent and the Foreign Agent wherein the data path is used by the Home Agent to send data packets sent to the Mobile Node from a Corresponding Node.

13. The method as claim 3, wherein the lookup acknowledgement packet is a registration request packet.

14. In a Home Agent that supports Mobile IP, a method of looking up a Mobile Node wherein the Mobile Node has previously registered with the Home Agent to notify the Home Agent that the Mobile Node has roamed to a specified Foreign Agent, the method comprising:
receiving a name lookup packet for a name lookup from a lookup requester, wherein the name lookup packet includes a lookup name;
composing a lookup notification packet, the lookup notification packet indicating that a name lookup for a Mobile Node corresponding to the lookup name in the name lookup packet has been received by the Home Agent;
sending the lookup notification packet to the Mobile Node via a Foreign Agent;
receiving a lookup acknowledgement packet from the Mobile Node via the Foreign Agent, the lookup acknowledgement packet corresponding to the lookup notification packet;
sending a lookup reply packet to the lookup requester indicating a status of the name lookup; and
prior to composing the lookup notification packet, looking up the lookup name in a lookup name table wherein the lookup name table maps the lookup name to one or more Mobile Node identifiers.

15. The method of claim 14, further comprising:
when the lookup name is not found in the lookup name table,
composing the lookup reply packet; and
sending the lookup reply packet to the lookup requester, wherein the lookup reply packet contains an error indicator indicating that the lookup name is unavailable.

16. In a Home Agent that supports Mobile IP, a method of looking up a Mobile Node wherein the Mobile Node has previously registered with the Home Agent to notify the Home Agent that the Mobile Node has roamed to a specified Foreign Agent, the method comprising:
receiving a name lookup packet for a name lookup from a lookup requester, wherein the name lookup packet includes a lookup name;
composing a lookup notification packet, the lookup notification packet indicating that a name lookup for a Mobile Node corresponding to the lookup name in the name lookup packet has been received by the Home Agent;
sending the lookup notification packet to the Mobile Node via a Foreign Agent;
receiving a lookup acknowledgement packet from the Mobile Node via the Foreign Agent, the lookup acknowledgement packet corresponding to the lookup notification packet;
sending a lookup reply packet to the lookup requester indicating a status of the name lookup; and
prior to sending the lookup notification packet, marking the lookup notification packet pending in a lookup request table entry in a name lookup table used to track pending lookup notification packets.

17. The method of claim 16, wherein the name lookup table entry corresponding to one of the pending lookup notification packets contains the lookup requester name.

18. The method of claim 16, wherein the name lookup table entry corresponding to one of the pending lookup notification packets contains the lookup name.

19. The method of claim 16, wherein the name lookup table entry corresponding to one of the pending lookup notification packets contains a lookup lifetime.

20. The method of claim 16, wherein the name lookup table entry corresponding to the lookup notification packet contains a Mobile Node identifier identifying the Mobile Node.

21. The method of claim 16, wherein the name lookup table entry corresponding to one of the pending lookup notification packets contains an IP address assigned to the Mobile Node.

22. The method of claim 16, further comprising:
checking a time remaining on a lookup lifetime in the name lookup table entry corresponding to one of the pending lookup notification packets; and
when the time remaining is below a certain value, composing the lookup reply packet, sending the lookup reply packet to the lookup requester and updating the name lookup table entry from the name lookup table, wherein the lookup reply packet contains an error indicator indicating the lookup name is unavailable.

23. The method of claim 16, further comprising:
after receiving the lookup acknowledgement packet,
updating the name lookup table entry from the name lookup table corresponding to one of the pending lookup notification packets.

24. In a Home Agent that supports Mobile IP, a method of looking up a Mobile Node wherein the Mobile Node has previously registered with the Home Agent to notify the Home Agent that the Mobile Node has roamed to a specified Foreign Agent, the method comprising:
receiving a name lookup packet for a name lookup from a lookup requester, wherein the name lookup packet includes a lookup name;
composing a lookup notification packet, the lookup notification packet indicating that a name lookup for a Mobile Node corresponding to the lookup name in the name lookup packet has been received by the Home Agent;
sending the lookup notification packet to the Mobile Node via a Foreign Agent;
receiving a lookup acknowledgement packet from the Mobile Node via the Foreign Agent, the lookup acknowledgement packet corresponding to the lookup notification packet;
sending a lookup reply packet to the lookup requester indicating a status of the name lookup; and
prior to sending the lookup notification packet,
assigning an IP address and a registration lifetime to the Mobile Node; and providing the IP address and the registration lifetime assigned to the Mobile Node in the lookup notification packet.

25. In a Home Agent that supports Mobile IP, a method of looking up a Mobile Node wherein the Mobile Node has previously registered with the Home Agent to notify the Home Agent that the Mobile Node has roamed to a specified Foreign Agent, the method comprising:
receiving a name lookup packet for a name lookup from a lookup requester, wherein the name lookup packet includes a lookup name;
composing a lookup notification packet, the lookup notification packet indicating that a name lookup for a Mobile Node corresponding to the lookup name in the name lookup packet has been received by the Home Agent;
sending the lookup notification packet to the Mobile Node via a Foreign Agent;
receiving a lookup acknowledgement packet from the Mobile Node via the Foreign Agent, the lookup acknowledgement packet corresponding to the lookup notification packet; and
sending a lookup reply packet to the lookup requester indicating a status of the name lookup;
wherein the lookup notification packet contains a registration request indicator, the registration request indicator requesting that the Mobile Node send a registration request packet to the Home Agent.

26. The method of claim 25, wherein the lookup acknowledgement packet is a registration request packet.

27. In a Home Agent that supports Mobile IP, a method of looking up a Mobile Node wherein the Mobile Node has previously registered with the Home Agent to notify the Home Agent that the Mobile Node has roamed to a specified Foreign Agent, the method comprising:
receiving a name lookup packet for a name lookup from a lookup requester, wherein the name lookup packet includes a lookup name;
composing a lookup notification packet, the lookup notification packet indicating that a name lookup for a Mobile Node corresponding to the lookup name in the name lookup packet has been received by the Home Agent;
sending the lookup notification packet to the Mobile Node via a Foreign Agent;
receiving a lookup acknowledgement packet from the Mobile Node via the Foreign Agent, the lookup acknowledgement packet corresponding to the lookup notification packet; and
sending a lookup reply packet to the lookup requester indicating a status of the name lookup;
wherein the lookup acknowledgement packet contains a registration lifetime selected by the Mobile Node.

28. In a Foreign Agent that supports Mobile IP, a method of looking up a Mobile Node wherein the Mobile Node has previously registered with the Home Agent to identify the Foreign Agent to which the Mobile Node has roamed, the method comprising:
receiving a lookup notification packet from the Home Agent, wherein the lookup notification packet indicates a name lookup including a lookup name corresponding to the Mobile Node has been received by the Home Agent, wherein the lookup notification packet includes an indicator requesting that the Mobile Node send a lookup acknowledgement packet to the Home Agent;
forwarding the lookup notification packet to the Mobile Node; and
receiving a lookup acknowledgement packet from the Mobile Node in response to the lookup notification packet.

29. The method of claim 28, further comprising:
forwarding the lookup acknowledgement packet to the Home Agent.

30. The method of claim 29, further comprising:
after receiving the lookup acknowledgement, establishing a data path between the Home Agent and the Foreign Agent, wherein the data path is used by the Home Agent to forward data packets sent to the Mobile Node from a Corresponding Node.

31. The method as recited in claim 28, wherein the lookup acknowledgement packet is a registration request packet.

32. A computer readable medium containing computer-readable instructions for looking up a Mobile Node that has previously registered with a Home Agent that supports Mobile IP, said computer readable medium comprising:
computer readable code for receiving a name lookup packet for a name lookup from a lookup requester, wherein the name lookup packet includes a lookup name;
computer readable code for composing a lookup notification packet, the lookup notification packet indicating a name lookup for a Mobile Node corresponding to the lookup name in the name lookup packet has been received by the Home Agent;
computer readable code for sending the lookup notification packet to the Mobile Node via a Foreign Agent, wherein the lookup notification packet includes an indicator requesting that the Mobile Node send a lookup acknowledgement packet to the Home Agent;
computer readable code for receiving a lookup acknowledgement packet from the Mobile Node via the Foreign Agent, the lookup acknowledgement packet corresponding to the lookup notification packet; and
computer readable code for sending a lookup reply packet to the lookup requester indicating a status of the name lookup.

33. The computer readable medium of claim 32, wherein the lookup reply packet includes an IP address assigned to the Mobile Node.

34. The computer readable medium of claim 33, wherein the lookup requester is a domain name server.

35. The computer readable medium as recited in claim 32, wherein the lookup acknowledgement packet is a registration request packet.

36. A computer system comprising:
a central processing unit; and
a memory having stored therein program instructions for looking up a Mobile Node that has previously registered with a Home Agent that supports Mobile IP, the memory comprising:
computer readable code for receiving a name lookup packet for a name lookup from a lookup requester wherein the name lookup packet includes a lookup name;
computer readable code for composing a lookup notification packet, the lookup notification packet indicating that a name lookup for a Mobile Node corresponding to the lookup name in the name lookup packet has been received by the Home Agent;
computer readable code for sending the lookup notification packet to the Mobile Node via a Foreign Agent, wherein the lookup notification packet includes an indicator requesting that the Mobile Node send a lookup acknowledgement packet to the Home Agent;

computer readable code for receiving a lookup acknowledgement packet from the Mobile Node via the Foreign Agent, the lookup acknowledgement packet corresponding to the lookup notification packet; and computer readable code for sending a lookup reply packet to the lookup requester indicating a status of the name lookup.

37. The computer readable medium of claim 36, further comprising:

computer readable code for receiving the registration request packet containing the first indicator from the Mobile Node.

38. The computer system as recited in claim 36, wherein the lookup acknowledgement packet is a registration request packet.

39. A computer readable medium containing computer-readable instruction for registering a Mobile Node without assigning an IP address instructions in a Home Agent that supports Mobile IP, said computer readable medium comprising:

computer readable code for determining whether the Mobile Node requires an IP address using a first indicator in a registration request packet;

computer readable code for generating a second indicator indicating that an IP address is not assigned to the Mobile Node, appending the second indicator to a registration reply packet, and sending the registration reply packet when it is determined that the Mobile Node does not require an IP address; and computer readable code for assigning an IP address to the Mobile Node and sending to the Mobile Node a registration reply packet containing the IP address when it is determined that the Mobile Node requires an IP address.

* * * * *